(12) United States Patent
Simpson et al.

(10) Patent No.: US 7,700,014 B2
(45) Date of Patent: Apr. 20, 2010

(54) VPI-RTM-CVD BRAKE DISC PREFORM DENSIFICATION

(75) Inventors: Allen H. Simpson, Buchanan, MI (US); Slawomir T. Fryska, Granger, IN (US); Mark L. La Forest, Granger, IN (US); Barry P. Soos, Mishawaka, IN (US)

(73) Assignee: Honeywell International Inc., Morris Township, NJ (US)

( * ) Notice: Subject to any disclaimer, the term of this patent is extended or adjusted under 35 U.S.C. 154(b) by 450 days.

(21) Appl. No.: 11/402,791

(22) Filed: Apr. 13, 2006

(65) Prior Publication Data

US 2006/0279012 A1 Dec. 14, 2006

Related U.S. Application Data

(60) Provisional application No. 60/688,383, filed on Jun. 8, 2005.

(51) Int. Cl.
*C01B 31/00* (2006.01)
(52) U.S. Cl. ............... 264/29.5; 264/29.7
(58) Field of Classification Search ........ 264/29.5, 264/29.6, 29.7
See application file for complete search history.

(56) References Cited

U.S. PATENT DOCUMENTS

| | | | | |
|---|---|---|---|---|
| 4,519,290 | A * | 5/1985 | Inman et al. ............ | 87/7 |
| 5,217,657 | A * | 6/1993 | Engle .................... | 264/29.5 |
| 5,382,392 | A * | 1/1995 | Prevorsek et al. ....... | 264/29.5 |
| 5,705,008 | A | 1/1998 | Hecht | |
| 6,077,464 | A | 6/2000 | Murdie et al. | |
| 6,255,234 | B1 * | 7/2001 | Erdemir et al. ......... | 442/97 |
| 6,325,608 | B1 | 12/2001 | Shivakumar et al. | |
| 6,521,152 | B1 * | 2/2003 | Wood et al. ............ | 264/121 |
| 6,537,470 | B1 | 3/2003 | Wood et al. | |
| 6,749,937 | B2 | 6/2004 | Gray | |
| 6,939,490 | B2 | 9/2005 | La Forest et al. | |
| 7,025,913 | B2 * | 4/2006 | La Forest et al. ....... | 264/29.1 |
| 7,063,870 | B2 * | 6/2006 | La Forest et al. ....... | 427/249.1 |
| 7,172,408 | B2 * | 2/2007 | Wood et al. ............ | 425/557 |
| 7,318,717 | B2 * | 1/2008 | Wood et al. ............ | 425/120 |
| 2003/0108635 | A1 * | 6/2003 | Wood et al. ............ | 425/200 |
| 2003/0111752 | A1 * | 6/2003 | Wood et al. ............ | 264/29.1 |
| 2003/0214064 | A1 * | 11/2003 | Shin et al. .............. | 264/29.7 |
| 2004/0113302 | A1 * | 6/2004 | La Forest et al. ....... | 264/29.1 |
| 2004/0168612 | A1 | 9/2004 | Saver | |
| 2006/0177663 | A1 * | 8/2006 | Simpson et al. ........ | 428/408 |
| 2006/0197244 | A1 * | 9/2006 | Simpson et al. ........ | 264/29.7 |

FOREIGN PATENT DOCUMENTS

WO   WO-2004/108859 A2   12/2004

OTHER PUBLICATIONS

James Klett et al.; "Slurry Molding of Carbon/Carbon Composites and Their Applications"; Carbon and Insulation Materials Technology Group, Metals and Ceramics Division, Oak Ridge National Laboratory, Oak Ridge, TN 37831-6087; pp. 1-2—published online on or prior to Apr. 25, 2005.
"Indiana 21$^{st}$ Century Research & Technology Fund Round Six Awards" pp. 1-11—published online on or prior to Apr. 25, 2005.

* cited by examiner

*Primary Examiner*—Steven P Griffin
*Assistant Examiner*—Erin Snelting
(74) *Attorney, Agent, or Firm*—Birch, Stewart, Kolasch & Birch, LLP

(57) ABSTRACT

Method of manufacturing dense carbon-carbon composite material by: infiltrating a fibrous preform with pitch to form pitch-infiltrated preform; carbonizing the pitch-infiltrated preform; injecting resin or pitch into the preform in a mold; oxygen stabilizing the filled preform and carbonizing and heat-treating the oxygen-stabilized impregnated preform; and subjecting the preform to a single final cycle of chemical vapor deposition. This process reduces densification time as compared to comparable conventional carbon-carbon composite manufacturing procedures.

9 Claims, No Drawings

VPI-RTM-CVD BRAKE DISC PREFORM DENSIFICATION

This non-provisional application claims the benefit of the filing date of provisional application Ser. No. 60/688,383, which was filed on Jun. 8, 2005. The entire contents of application Ser. No. 60/688,383 are expressly incorporated by reference into the present application.

FIELD OF THE INVENTION

This invention relates to the manufacture of carbon-carbon composites. The process of the present invention is especially suitable for the manufacture of carbon-carbon composite brake discs for use in such applications as aircraft landing systems.

BACKGROUND OF THE INVENTION

U.S. Pat. No. 6,537,470 B1 discloses a process for rapidly filling fibrous preforms and/or rigid, porous bodies with high viscosity resin or pitch. The process described in U.S. Pat. No. 6,537,470 is referred to as resin transfer molding (RTM). RTM processing is suitable for impregnating single or multiple porous bodies placed in a mold. The process may use a fibrous preform or rigid porous body, which is placed into a mold matching the desired part geometry. A resin is injected into the mold at high temperature and pressure. The mold is constructed from two mating pieces fitted to form one or more mold cavities. A gate fitted with a nozzle is set into one of the mold pieces, and a valve admits resin or pitch into the gate area. Venting or vacuum can be applied to the mold. The mold itself is held in a hydraulic press and an extruder is employed to supply the molten resin or pitch to the mold.

Resin transfer molding processing reduces densification costs in the manufacture of carbon-carbon composites. Because the high pressures used in RTM processing can destroy soft preforms, however, current processing includes a step of hardening/toughening the preforms using chemical vapor densification (CVD) prior to RTM densification.

SUMMARY OF THE INVENTION

In the present invention, the initial CVD cycle is replaced by a cycle of infiltration with molten pitch. This pitch infiltration step may be facilitated by the application of vacuum and/or pressure. The present invention reduces densification time as compared to comparable conventional carbon-carbon composite manufacturing procedures. Densification time can be reduced more than 50% by the present invention compared to densification using only CVD processes. The process of the present invention is less costly than conventional processing, due to its reduced dependence on CVD processing and the attendant capital investment.

This invention provides a method to rapidly densify a fibrous preform in order to manufacture a carbon-carbon composite material of medium to high density at low cost. The method of this invention comprises various steps.

In accordance with this invention, at least one fibrous preform, made of carbon fiber or carbon fiber precursors is provided. These preforms may be made, for instance, of oxidized polyacrylonitrile fiber, stabilized pitch fiber, rayon fiber, or a combination of said fibers, and may be nonwoven preforms, needled fiber preforms, or random fiber preforms. In this invention, multiple preforms may be placed in a single mold.

Optionally, the fibrous preform may be carbonized, e.g. at approximately 1800° C., before proceeding to the next step. The next step involves infiltrating the preform with pitch, e.g. isotropic coal tar pitch or mesophase pitch at a temperature that is at least about 50° C. higher than the melting point of the pitch, to form a pitch-infiltrated preform. This step may be conducted under vacuum or under pressure, for instance under a vacuum of below 50 torr or at a pressure in the range 30-300 psi. Often, this pitch-infiltration step will be done entirely under vacuum or entirely under pressure. However, in some cases, for instance, vacuum may be employed to initiate the process and then pressure may be used to finish it, or vice versa.

The pitch-infiltrated preform resulting from the preceding step is carbonized, and optionally removing excess carbonized pitch from and/or optionally heat-treating said pitch-infiltrated preform after this carbonization step. Carbonization and heat treatment at this stage are typically conducted at a temperature in the range 1200 to 2800° C. for a period in the range of from 18 hours to 3 days.

The resulting porous preform is placed into a mold, a temperature above a melting point of a resin or pitch to be transferred into the preform is generated, and the mold is constrained so that the mold retains its configuration. Then a high melting point, high viscosity, molten resin or pitch is injected into the mold to effect a uniform impregnation of the preform by means of a pressure gradient in the mold. This pressure gradient may be provided by tapering in the cavity of the mold or by a protrusion in the cavity of the mold. The resin used in this step may be, for instance, coal tar mesophase pitch, petroleum mesophase pitch, or AR mesophase pitch. In this step, the mold may be heated, for instance, to a temperature in the range 138 to 310° C. and the preform may be heated, for instance, to a temperature in the range 200 to 425° C.

The resin or pitch in the preform is allowed to cool below its melting point. While this cooling can be effected by ambient conditions, in some instances the rate of cooling could if desired be accelerated by conventional expedients such as forced air or refrigeration techniques. Once cooled below the melting point of the resin or pitch therein, the densified preform is subjected to oxygen stabilization to inhibit melting of the resin or pitch during subsequent carbonization and heat-treatment (e.g., at a temperature of approximately 1800° C.).

Finally, the preform produced as described above is subjected to a single, final cycle of chemical vapor deposition. This CVD processing may be conducted, for instance, at a pressure between 4 torr and 30 torr and a temperature in the range 500 to 2000° C.

A significant feature of the present invention is that all of the above steps can be completed in a relatively short period of time and still provide a carbon-carbon composite having a density of 1.7 g/cc or higher.

DETAILED DESCRIPTION OF THE INVENTION

The present invention employs vacuum pitch infiltration (VPI), RTM processing, and CVD processing together in a way that provides a low cost, rapid densification process. In this invention, each of these three processing steps satisfies a unique processing need as it contributes to the over-all densification process.

When practicing this invention, a fibrous preform (a preform made of carbon fiber or carbon fiber precursors) is infiltrated with coal tar pitch or any pitch having a melting point that is appropriate for the temperatures to be used in the vacuum pressure pitch infiltration cycle. The present invention is not limited as to preform architecture (e.g., nonwoven, chopped fiber, etc.) or fiber type. Virtually any carbon fiber or carbon fiber precursor (e.g., oxidized PAN) can be processed in accordance with this invention, so long as the fibrous material does not shrink axially more than about 15% during carbonization. The level of vacuum when employed in this step is typically below 50 torr initially. After the process vessel is flooded with pitch and the preforms are completely covered with pitch, pressure may be applied, e.g., by a nitrogen source. The pressure applied may be, for instance, in the range 30-300 psi, more usually, at a level in the range 50-200 psi. Vacuum and/or pressure in accordance with this invention can be cycled or pulsed, if desired. Vacuum pressure pitch infiltration is preferably conducted at a temperature that is about 50° C. or more (preferably, 100° C. or more) above the softening point of the pitch.

The pitch-infiltrated preform is then carbonized. Carbonization typically requires from 18 hours to 3 days. The infiltration and carbonization steps together cost about ⅓as much as does a CVD processing step. Following the carbonization process and a heat treatment step (normally between 1200° C. and 2800° C., depending upon performance criteria specifications), the preform is tough enough to under go Resin Transfer Molding processing.

The RTM process impregnates the preform with high carbon yielding pitch (e.g., coal tar mesophase pitch, petroleum mesophase pitch, or AR mesophase pitch), after which the preform undergoes oxygen stabilization and carbonization. RTM is used in this step to effect the mesophase pitch infiltration because RTM processing provides the pressures required to drive the high viscosity pitch through the thickness of the preform. Full details of RTM processing may be found in U.S. Pat. No. 6,537,470 B1, the entire contents of which are hereby expressly incorporated by reference.

After this RTM step, the preform generally has a density of approximately 1.55 g/cc or higher. In accordance with the present invention, the time to produce a part with this density is reduced by about two weeks by comparison to conventional manufacturing procedures. At this stage the preform is ready for final densification employing CVD processing. Where the present disclosure refers for convenience to CVD processing, those skilled in the art will realize that CVI (chemical vapor infiltration) processing is likewise contemplated by the nomenclature CVD processing.

EXAMPLE

A carbonized brake disc preform, designed for use in a very large passenger jet aircraft, having an initial density of about 0.5 g/cc, is densified and made rigid with a cycle of vacuum pitch infiltration at 300° C. employing Koppers 180° C. melting point isotropic coal tar pitch. The rigidized preform is then subjected to a rapid (48 hours) carbonization cycle to 650° C. and heat treatment to 1800° C. This provides a preform having a density of about 1.0 g/cc. The preform is then subjected to one Resin Transfer Molding cycle employing AR mesophase pitch. After this RTM step, the preform density is approximately 1.62 g/cc. This preform is then oxygen-stabilized, carbonized to 800° C., and undergoes heat treatment to 1800° C. The densification of this carbon-carbon material is then completed using one cycle of chemical vapor deposition, at a temperature of approximately 1000° C. and a pressure of approximately 15 torr, to a final density of approximately 1.75 g/cc. The cost of densifying the fiber preform to 1.75 g/cc is reduced by 47%.

The present invention has been described herein in terms of preferred embodiments. However, obvious modifications and additions to these embodiments will become apparent to those of ordinary skill in the art upon a reading of the foregoing description. It is intended that all such obvious modifications and additions form a part of the present invention to the extent that they fall within the scope of the several claims appended hereto.

What is claimed is:

1. A method to rapidly densify a fibrous jet aircraft brake disc preform in order to manufacture a carbon-carbon composite material of medium to high density at low cost, said method comprising the steps of:
   (i.) providing at least one fibrous brake disc preform, made of carbon fiber or carbon fiber precursors, selected from the group consisting of nonwoven preforms, needled fiber preforms, and random fiber preforms;
   (ii.) infiltrating said preform with isotropic coal tar pitch to form a pitch-infiltrated preform under a vacuum of below 50 torr via a single cycle of Vacuum Pitch Infiltration (VPI) processing;
   (iii.) carbonizing said pitch-infiltrated preform for a period of from 18 hours to 3 days, and optionally removing excess carbonized pitch from and/or optionally heat-treating said pitch-infiltrated preform after this carbonization step;
   (iv.) placing the resulting porous preform into a mold, generating a temperature above a melting point of a AR mesophase pitch to be transferred into the preform, and constraining the mold so that the mold retains its configuration;
   (v.) injecting high viscosity AR mesophase pitch into the mold and driving said high viscosity pitch through the thickness of the jet aircraft brake disc preform via a single cycle of Resin Transfer Molding (RTM) processing to effect a uniform impregnation of the preform via a pressure gradient in the mold and to provide the preform with a density of 1.55 g/cc or higher;
   (vi.) allowing the AR mesophase pitch in the preform to cool below its melting point;
   (vii.) subjecting the densified preform to oxygen stabilization to inhibit melting of the AR mesophase pitch during carbonization;
   (viii.) carbonizing and heat-treating the oxygen-stabilized impregnated preform prepared in step (vii.); and
   (ix.) subjecting the preform produced in step (viii.) to a single final cycle of chemical vapor deposition (CVD) to provide a carbon-carbon composite preform having a density of 1.7 g/cc or higher, wherein step (ix.) is the sole CVD cycle employed in the course of manufacturing said jet aircraft brake disc preform.

2. The method of claim 1, in which multiple preforms are placed in a single mold.

3. The method of claim 1, wherein the preform of step (i.) is a random fiber preform made of oxidized polyacrylonitrile fiber, stabilized pitch fiber, rayon fiber, or a combination of said fibers.

4. The method of claim 1, which comprises a step of carbonizing said fibrous preform subsequent to step (i.) and prior to step (ii.).

5. The method of clam 1, wherein the carbonization and heat treatment in step (iii.) is conducted at a temperature in the range 1200-2800° C.

6. The method of claim 1, wherein the pressure gradient in the mold in step (v.) is provided by tapering in the cavity of said mold or a protrusion in the cavity of said mold.

7. The method of claim 6, wherein the mold is heated to a temperature in the range 138-310° C. and the preform is heated to a temperature in the range 200-425° C.

8. The method of claim 1, wherein step (ix.) is conducted at a pressure between 4 torr and 30 torr and a temperature in the range 500-2000° C.

9. A method to rapidly densify a fibrous jet aircraft brake disc preform in order to manufacture a carbon-carbon composite material of medium to high density at low cost, said method comprising the steps of:

(i.) providing at least one fibrous brake disc preform having a density of 0.5 g/cc, made of carbon fiber or carbon fiber precursors, selected from the group consisting of nonwoven preforms, needled fiber preforms, and random fiber preforms;

(ii.) infiltrating said preform with isotropic coal tar pitch to form a pitch-infiltrated preform under a vacuum of below 50 torr via a single cycle of Vacuum Pitch Infiltration (VPI) processing;

(iii.) carbonizing said pitch-infiltrated preform for a period of from 18 hours to 3 days, and optionally removing excess carbonized pitch from and/or optionally heat-treating said pitch-infiltrated preform after this carbonization step, to provide a preform having a density of 1.0 g/cc;

(iv.) placing the resulting porous preform into a mold, generating a temperature above a melting point of a AR mesophase pitch to be transferred into the preform, and constraining the mold so that the mold retains its configuration;

(v.) injecting high viscosity AR mesophase pitch into the mold and driving said high viscosity pitch through the thickness of the jet aircraft brake disc preform via a single cycle of Resin Transfer Molding (RTM) processing to effect a uniform impregnation of the preform via a pressure gradient in the mold and to provide the preform with a density of 1.55 g/cc or higher;

(vi.) allowing the AR mesophase pitch in the preform to cool below its melting point;

(vii.) subjecting the densified preform to oxygen stabilization to inhibit melting of the AR mesophase pitch during carbonization;

(viii.) carbonizing and heat-treating the oxygen-stabilized impregnated preform prepared in step (vii.) at a temperature of 1800° C.; and (ix.) subjecting the preform produced in step (viii.) to a single final cycle of chemical vapor deposition (CVD) to provide a carbon-carbon composite preform having a density of 1.7 g/cc or higher, wherein step (ix.) is the sole CVD cycle employed in the course of manufacturing said jet aircraft brake disc preform.

\* \* \* \* \*